(No Model.)

G. F. WENTZ.
PIPE COUPLING.

No. 581,050. Patented Apr. 20, 1897.

Witnesses
T. Lloyd MacKaber
T. E. Royle

Inventor
George F. Wentz.
By his Attorneys,
C. A. Snow & Co.

UNITED STATES PATENT OFFICE.

GEORGE FRANKLIN WENTZ, OF COLORADO SPRINGS, COLORADO.

PIPE-COUPLING.

SPECIFICATION forming part of Letters Patent No. 581,050, dated April 20, 1897.

Application filed February 4, 1896. Serial No. 578,030. (No model.)

*To all whom it may concern:*

Be it known that I, GEORGE FRANKLIN WENTZ, a citizen of the United States, residing at Colorado Springs, in the county of El Paso and State of Colorado, have invented a new and useful Pipe-Coupling, of which the following is a specification.

My invention relates to couplings for air and steam pipes, and the object in view is to provide a simple and efficient construction and arrangement of parts whereby the extremities of the connected pipe-sections are locked in the coupling by the means employed for packing the joint.

Further objects and advantages of this invention will appear in the following description, and the novel features thereof will be particularly pointed out in the appended claim.

Figure 1:
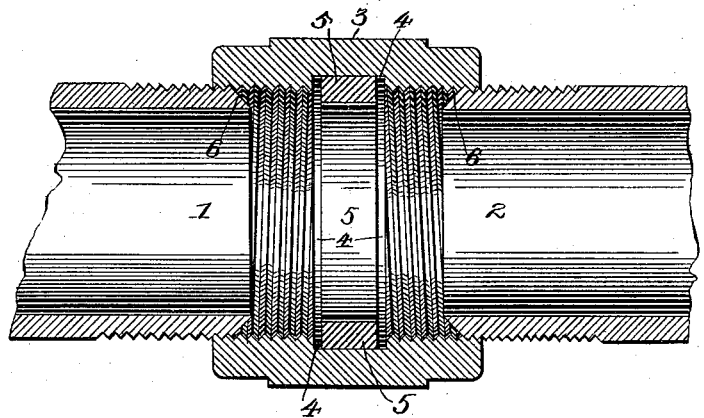
Figure 2:
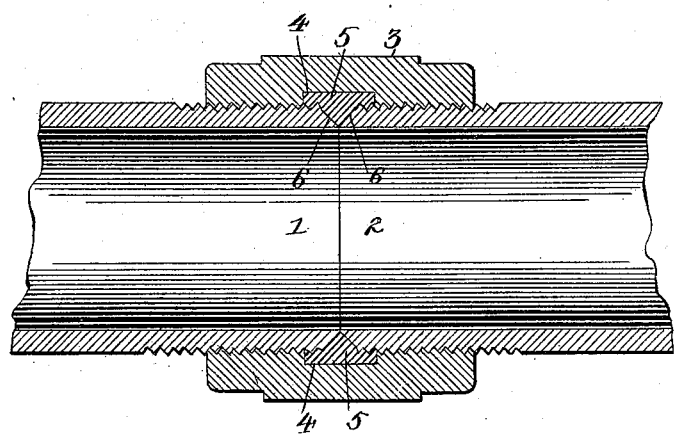

In the drawings, Figure 1 is a longitudinal section of a coupling constructed in accordance with my invention with the contiguous terminals of pipe-sections introduced into the ends of the coupling and the packing-ring arranged in the position which it occupies previous to tightening the coupling. Fig. 2 is a similar view showing the coupling tightened and the terminals of the pipe-sections drawn together to compress the packing.

Similar numerals of reference indicate corresponding parts in both figures of the drawings.

1 and 2 designate, respectively, the contiguous extremities of pipe-sections to be connected by a coupling 3, having its bore provided at opposite ends or upon opposite sides of its center with right and left screw-threads. Between the inner extremities of the threaded portions of the coupling is formed a circumferential groove 4 of larger diameter than the bore of the coupling and adapted to receive a packing-ring 5, of soft metal, such as lead. When inserted, this packing-ring is of smaller diameter exteriorly than are the threaded portions of the coupling interiorly to facilitate introduction, and after arranging the packing-ring opposite the circumferential groove it is expanded to prevent accidental displacement, as shown in Fig. 1, the interior diameter of said packing-ring, after expansion, being slightly greater than the interior diameter of the pipe-sections, as will also be seen by reference to Fig. 1.

The right and left threaded extensions of the pipe-sections are terminally beveled at their outer sides, as shown at 6, and when the coupling is turned to draw the pipe-sections toward each other said beveled surfaces of the pipe-sections come in contact with the inner surface of the packing-ring and further expand the latter and compress it into the circumferential groove in the coupling. This compression of the packing-ring is continued until it entirely fills the cross-sectionally triangular space bounded by the floor of the groove and the oppositely-beveled surfaces of the extremities of the pipe-sections. The compression of the packing-ring is to be continued to the desired extent or until it has had the effect of hardening the material of the ring, and the elasticity thereof causes sufficient frictional contact with the extremities of the pipe-sections to form a lock to prevent relative movement of the pipe-sections and couplings.

From the above description it will be seen that shrinkage or expansion of the parts or vibration due to jarring of the pipe-sections cannot affect the tightness of the joint, and the interlocking threads of the coupling and pipe-sections may be comparatively loose to facilitate connection of the members without in any way detracting from the efficiency of the union when completed.

The inner extremities of the threaded portions of the pipe-sections extend into the space formed by the counterbore at the center of the coupling, whereby when the packing-ring is expanded by the inward feeding of the pipe-sections and is thereby spread laterally into contact with the shoulders forming the walls of the counterbore said ring will be engaged by the overlapping threaded portions of the pipe-sections, thereby forming a break-joint, which adds to the efficiency of the coupling.

Various changes in the form, proportion, and the minor details of construction may be resorted to without departing from the spirit or sacrificing any of the advantages of this invention.

Having described my invention, what I claim is—

The combination of an interiorly-threaded coupling-sleeve provided with a central counterbored annular channel of larger diameter than the threaded portion, a cross-sectionally rectangular packing-ring of soft metal of smaller exterior diameter than the threaded portions of the sleeve to provide for the introduction thereof into the central channel, and adapted to be subsequently expanded to prevent accidental displacement, and the exteriorly-threaded extremities of pipe-sections adapted to engage said threaded portions of the coupling-sleeve and provided with exteriorly-beveled terminals to engage and compress the packing-ring by expansion to fill the space between said beveled extremities of the pipe-sections and the wall of said channel, the packing-ring being of less width than the channel to provide for lateral spreading thereof, limited by the shoulders at the extremities of the channel and the extremities of the threaded portions of the pipe-sections extending into the space formed by the counterbore, substantially as specified.

In testimony that I claim the foregoing as my own I have hereto affixed my signature in the presence of two witnesses.

GEORGE FRANKLIN WENTZ.

Witnesses:
J. ARTHUR CONNELL,
W. M. BROWN.